(12) United States Patent
Barillot et al.

(10) Patent No.: US 11,009,110 B2
(45) Date of Patent: May 18, 2021

(54) SCREW-BASED NANOMETRIC MOTION CONTROL MECHANISM

(71) Applicant: CEDRAT TECHNOLOGIES, Meylan (FR)

(72) Inventors: François Barillot, Le Versoud (FR); Christian Belly, Gières (FR); Adrien Guignabert, Meylan (FR)

(73) Assignee: CEDRAT TECHNOLOGIES, Meylan (FR)

( * ) Notice: Subject to any disclaimer, the term of this patent is extended or adjusted under 35 U.S.C. 154(b) by 0 days.

(21) Appl. No.: 16/781,339

(22) Filed: Feb. 4, 2020

(65) Prior Publication Data
US 2020/0248787 A1    Aug. 6, 2020

(30) Foreign Application Priority Data

Feb. 4, 2019 (FR) ..................... 1901082

(51) Int. Cl.
| | |
|---|---|
| *F16H 25/20* | (2006.01) |
| *F16H 25/24* | (2006.01) |
| *H02N 2/02* | (2006.01) |
| *G02B 26/08* | (2006.01) |

(52) U.S. Cl.
CPC .......... *F16H 25/20* (2013.01); *F16H 25/24* (2013.01); *H02N 2/02* (2013.01); *F16H 2025/2084* (2013.01); *G02B 26/0858* (2013.01)

(58) Field of Classification Search
CPC .. F16H 25/20; F16H 25/24; F16H 2025/2084; H02N 2/02; G02B 26/0858
See application file for complete search history.

(56) References Cited

U.S. PATENT DOCUMENTS

| | | | | |
|---|---|---|---|---|
| 4,487,087 A | * | 12/1984 | Johnstone | ................ B23Q 5/56 74/409 |
| 5,676,019 A | * | 10/1997 | Shenk | ..................... F16H 25/24 74/424.95 |
| 6,116,107 A | * | 9/2000 | Kafai | ..................... F16H 25/24 74/424.71 |
| 7,353,837 B2 | * | 4/2008 | Biester | ..................... F16K 1/12 137/219 |
| 9,874,075 B2 | * | 1/2018 | DiSantis | ............. E21B 41/0085 |

(Continued)

FOREIGN PATENT DOCUMENTS

| | | |
|---|---|---|
| CN | 102651623 A | 8/2012 |
| EP | 0292989 A2 | 11/1988 |

(Continued)

*Primary Examiner* — David M Fenstermacher
(74) *Attorney, Agent, or Firm* — Oliff PLC

(57) ABSTRACT

The motion control mechanism comprises a rotor mounted rotating around an axis. The rotor has a first threaded part and a second threaded part separated by a central part placed in contact with a stator excited by an oscillator. A frame defines a first threaded part collaborating with the first threaded part of the rotor. The second threaded part of the rotor collaborates with an output shaft. Rotation of the rotor with respect to the frame results in movement of the output shaft along the axis. The oscillator comprises an oscillating mass excited by an angular actuator formed by piezoelectric actuators arranged around a star-shaped support. The oscillator is fitted inside the rotor configured in the form of a bell and comprising several stressed sectors.

17 Claims, 10 Drawing Sheets

(56) References Cited

U.S. PATENT DOCUMENTS

| | | | |
|---|---|---|---|
| 10,161,560 B2* | 12/2018 | Li | F16M 11/18 |
| 2003/0010146 A1 | 1/2003 | Matsushita | |
| 2011/0181151 A1* | 7/2011 | Kang | B28D 5/0082 |
| | | | 310/328 |
| 2012/0314269 A1 | 12/2012 | Takano et al. | |
| 2014/0152151 A1* | 6/2014 | Potemkin | H02N 2/02 |
| | | | 310/328 |
| 2015/0198222 A1* | 7/2015 | Klassen | F16H 19/08 |
| | | | 74/25 |
| 2018/0254717 A1* | 9/2018 | Zhelyaskov | H02N 2/026 |
| 2020/0248787 A1* | 8/2020 | Barillot | H02N 2/101 |
| 2020/0371376 A1* | 11/2020 | Giusti | H01L 41/0953 |

FOREIGN PATENT DOCUMENTS

| | | |
|---|---|---|
| FR | 2740276 A1 | 4/1997 |
| JP | H08-251950 A | 9/1996 |
| JP | 2010-028955 A | 2/2010 |
| JP | 2011-169254 A | 9/2011 |
| WO | 2010/109826 A1 | 9/2010 |

\* cited by examiner

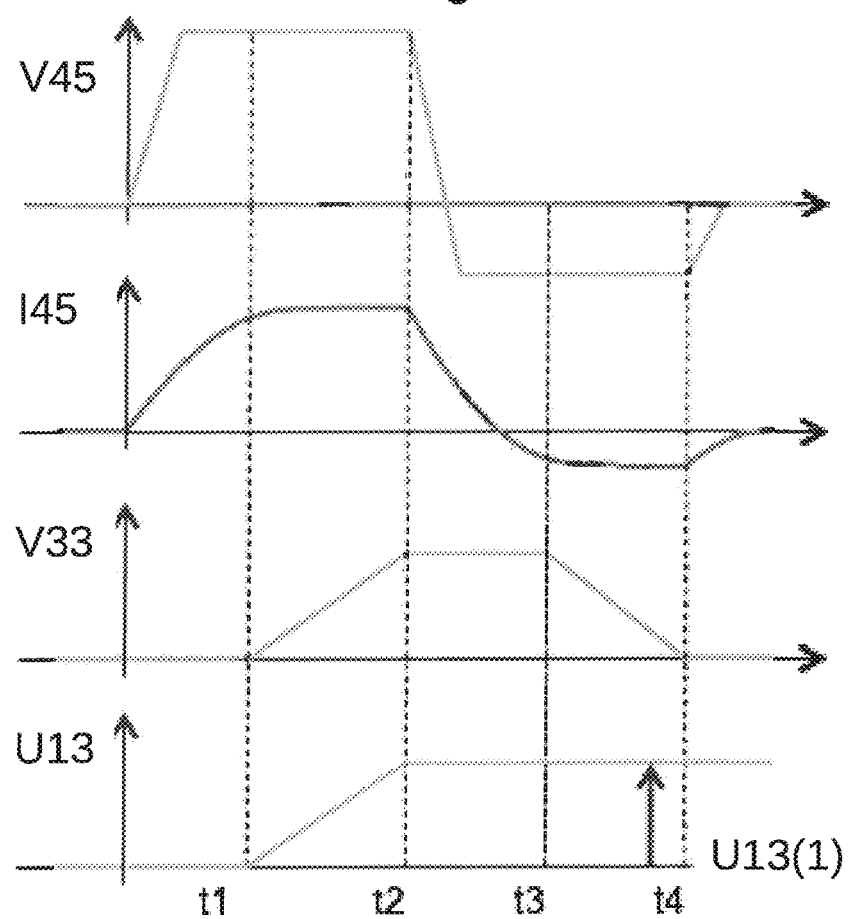

SCREW-BASED NANOMETRIC MOTION CONTROL MECHANISM

BACKGROUND OF THE INVENTION

The invention relates to a linear positioning mechanism.

PRIOR ART

Motor-driven screws are used to produce linear long-stroke positioning actuators providing securing in position, for example to perform focusing functions in optics.

The most common concept of a electromechanical actuator with a motor-driven screw is described for example in the document US2003010146A. The electro-mechanical actuator comprises a geared electric motor turning a screw that drives a part in the form of a nut in translation, a guided moving part being fixed to the latter. Rotation of the screw with respect to the nut results in translational movement of the nut.

This configuration presents several shortcomings. The geared motor is a cumbersome component. This results in the electromechanical actuator often being laterally very bulky and/or very long along the actuation axis. In addition, on account of the clearance of the geared motor, the resolution and precision of positioning are limited.

To improve the compactness and precision of an electromechanical actuator of motor-driven screw type, one solution consists in driving a screw by means of a direct-drive piezoelectric motor. In document US2012314269, the motor is an ultrasonic motor equipped with a piezoelectric vibrating stator driving a rotor including a nut by friction, rotation of which turns a screw generating linear forward and backward movement of the latter. Rotation of the nut thus drives the screw which supports a load to be positioned. The load to be positioned is driven by the end of the screw by coming into pressing contact with the end of the screw via a spring.

One of the shortcomings of this configuration is that the load is not secured to the screw that drives it, in spite of the spring. It is possible for the load to come at least partially dissociated from the drive screw in case of large vibrations or shocks. These shocks are commonly encountered in on-board applications, for example in aeronautical or space applications. Dissociation will result in detachments generating local shocks between the load and screw. These local shocks cause damage to the pressing contact area and result in the creation of particles. Accelerated wear of the electromechanical actuator then occurs with loss of surface quality, which is extremely unfavourable for high-precision positioning. The wear particles can lodge themselves in the screw threads, which is also detrimental for performing high-precision positioning. It is also apparent that the configuration presented in the document US2012314269 is not suitable for supporting high external stresses. The force chain between the load and frame passes via bearings which are a weak point in the mechanisms.

Furthermore, the rotor that turns the screw is driven on its cylindrical surface by friction, by an operation of sliding-adhesion type, via a piezoelectric stator that is electrically excited and made to oscillate in vibrating manner. Each oscillation of the stator drives the cylindrical surface of the rotor tangentially typically through 10 microns. Complete rotation of a rotor having a radius R equal, to 16 mm is performed with about 10,000 oscillations and results in the screw advancing by one step, i.e. typically 1 mm. The linear resolution of the mechanism is therefore 100 nm.

It is theoretically possible to improve the linear resolution by using finer threads. Finer screw threads are however also mechanically less resistant to the vibrations and shocks encountered in on-board applications and are incompatible with transmission of high forces.

To further reduce the size of the electromechanical actuator, one solution consists in performing the direct screw driving by means of a piezoelectric drive. Such a solution is presented in the document JPH08251950 where the screw is driven in rotation by friction and more particularly by sliding-adhesion at the level of the rotor thread by means of a piezoelectric stator excited by a signal of asymmetrical sawtooth type, according to the principle of inertia motors. The principle of the piezoelectric inertia motor is described for example in the document EP0292989 by T. Higuchi. In the document JPH08251950, the load to be positioned is also driven by simple placing in contact with the end of the screw. Two jaws provided with a screw thread move with respect to one another resulting in movement of the screw held between the two jaws.

The drawbacks of this method are identical to the previous configuration. The load moves with respect to the screw that is able to move in rotation and in translation so that the load can become detached from the drive screw in case of shocks or large vibrations, which is not acceptable in on-board applications. It is also apparent that the configuration presented in the document JPH08251950 cannot withstand high external stresses as the force chain between the load and frame passes via the piezoelectric stator. Piezoelectric materials do however is present very low limits when they are subjected to tensile stresses.

It is finally apparent that the configuration of document JPH08251950 uses the thread of the screw able to move in rotation and in translation as frictional drive surface of the screw. This screw thread is subjected to large frictions which means that it wears resulting in clearance appearing in the screw. This clearance due to wear of the screw rapidly reduces the precision of the mechanism with time.

OBJECT OF THE INVENTION

The object of the invention is to remedy these shortcomings and more particularly to provide a motion control mechanism able to withstand high external stresses while performing high-precision positioning in particular in the nanometric range, and advantageously to provide a mechanism designed for on-board applications.

According to the invention, this object is achieved by a linear motion control mechanism of an output shaft that comprises:
- a rotor presenting a first threaded part and a circular drive surface rotatable around an axis,
- a frame defining a first threaded part collaborating with the first threaded part of the rotor, rotation of the rotor with respect to the frame causing translation of the rotor with respect to the frame along the axis,
- an output shaft connected to the rotor,
- a stator configured to generate rotational micro-movements of the rotor, the stator being designed to be brought into contact with the circular drive surface to drive the circular drive surface and make the rotor rotate.

The mechanism is remarkable in that:
- the rotor comprises a second threaded part separated from the first threaded part by a central part comprising the circular drive surface, a blocking device is configured to prevent rotation of the output shaft around the axis with respect to the frame, the output shaft has a second part designed to secure a load to be moved and a threaded first end collaborating with the second threaded part of the rotor, rotation of the rotor with respect to the frame causing translation of the output shaft with respect to the rotor and to the frame along the axis.

Preferentially, the rotor defines a hollow area and the circular drive surface is an inner surface of the rotor.

According to one development of the invention, the blocking device is flexible along the axis and the blocking device advantageously comprises at least one segmented membrane formed by several thin blades arranged in the form of a honeycomb, spirals, a cross or concentric circles.

According to one development of the invention, the stator comprises an oscillator supplied by a control circuit delivering electric signals to an exciter comprising at least one piezoelectric actuator to cause deformation of the exciter.

According to one development of the invention, the exciter presents a rotational symmetry in a plane perpendicular to the axis. The exciter comprises a support defining several arms and several piezoelectric actuators, each piezoelectric actuator being fixed to a support arm by a flexible articulation.

According to another development of the invention, the piezoelectric actuators each have a shell defining a housing for a piezoelectric stack, the shell and piezoelectric stack being configured so that a deformation by a first value of the piezoelectric stack in a first direction causes a deformation of the shell by a second value higher than the first value in a second direction, the shell being connected to the support in the second direction.

According to one development of the invention, the shells of the piezoelectric actuators together with the support form a monolithic assembly.

According to one development of the invention, the circular drive surface is is partially open and the stator has an oscillating mass of circular shape in contact with the circular drive surface to make the rotor rotate.

According to a particular embodiment, the circular drive surface is defined by a plurality of sectors fixed to a shaft of the rotor by a plurality of arms, the mechanism comprising a preloading system configured to apply a stress on the plurality of arms and to modify a radius of the circular drive surface.

According to a particular embodiment, the control circuit delivers the exciter with at least one sinusoidal signal having a frequency comprised between 1 kHz and 100 kHz generating a substantially elliptical vibration of the oscillator.

According to a development of the invention, the control circuit delivers non-symmetrical sawtooth AC electric signals to the piezoelectric actuators.

According to a particular embodiment, the oscillator is provided with at least one contact arm radially movable between an active position where the at least one contact arm applies a contact pressure higher than a threshold pressure ensuring adhesion with the circular drive surface and an inactive position in which the at least one contact arm does not have any contact with the circular drive surface or in which the contact arm applies a contact pressure lower than the threshold pressure ensuring adhesion with the circular drive surface. The oscillator comprises a radial actuator supplied by the control circuit and configured to move the at least one contact arm between the active position and the inactive position.

According to a particular embodiment, the contact arm comprises a magnetic armature and the radial actuator has a coil supplied by the control circuit and collaborating with the magnetic armature to move the magnetic armature and cause movement of the contact arm between the active position and the inactive position.

According to another embodiment of the invention, the contact arm is fitted movable on a pivot link mounted in fixed manner on the exciter.

It is a further object of the invention to provide an operating method of such a motion control mechanism that is easy to use and procures a better mechanical strength than devices of the prior art, associated with a high positioning resolution.

These advantages tend to be achieved by means of a first method for using a motion control mechanism according to one of the foregoing embodiments and which successively comprises the following phases:

deforming the oscillator with a first deformation rate to bring about a rotational movement of the rotor, the oscillator being deformed from the reference position and being in adherent mechanical contact with the circular drive surface, deforming the oscillator with a second deformation rate higher than the first deformation rate to drive the oscillator towards the reference position, the second deformation rate causing sliding of the oscillator with respect to the circular drive surface.

These advantages tend to be achieved by means of a second method for using a motion control mechanism according to one of the foregoing embodiments and which successively comprises:

placing the contact arm in the active position to achieve contact of the contact arm and adhesion with the circular drive surface, deforming the oscillator from a reference position to obtain a component tangential to the cylindrical drive surface, deformation of the oscillator causing rotation of the rotor, placing the contact arm in the inactive position to eliminate the mechanical contact with the circular drive surface, or applying a contact pressure lower than an adhesion threshold pressure between the contact arm and the circular drive surface, moving the oscillator back to the reference position.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which:

FIG. 10 presents a timing diagram of the control signals of the mechanism illustrated in FIG. 9 to perform a movement of the rotor of quasi-static stepper type.

DESCRIPTION OF THE EMBODIMENTS

Figure 1:
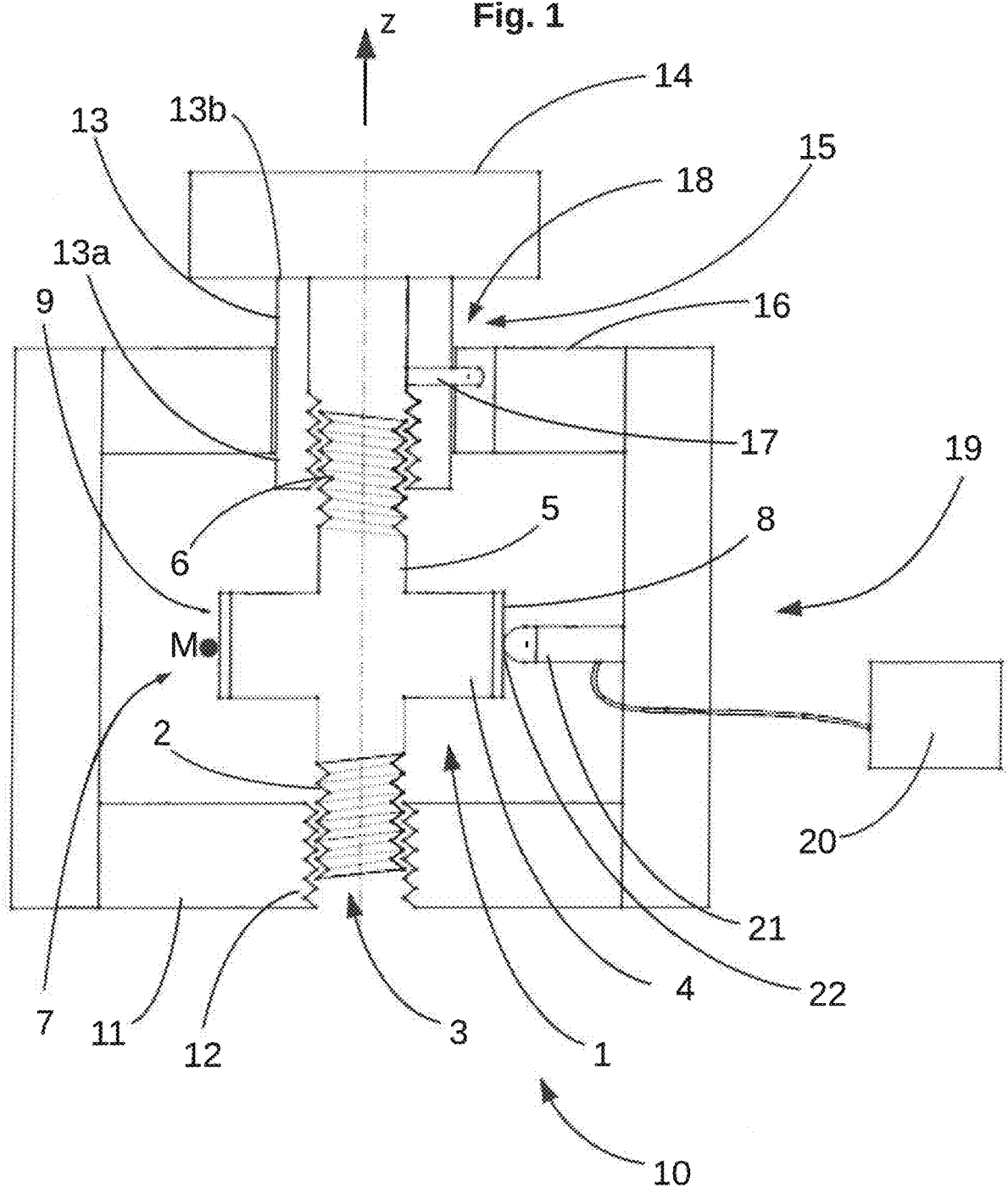
FIG. 1 illustrates a first embodiment of a screw-based translational motion control mechanism, in schematic manner, in cross-section.
Figure 2:
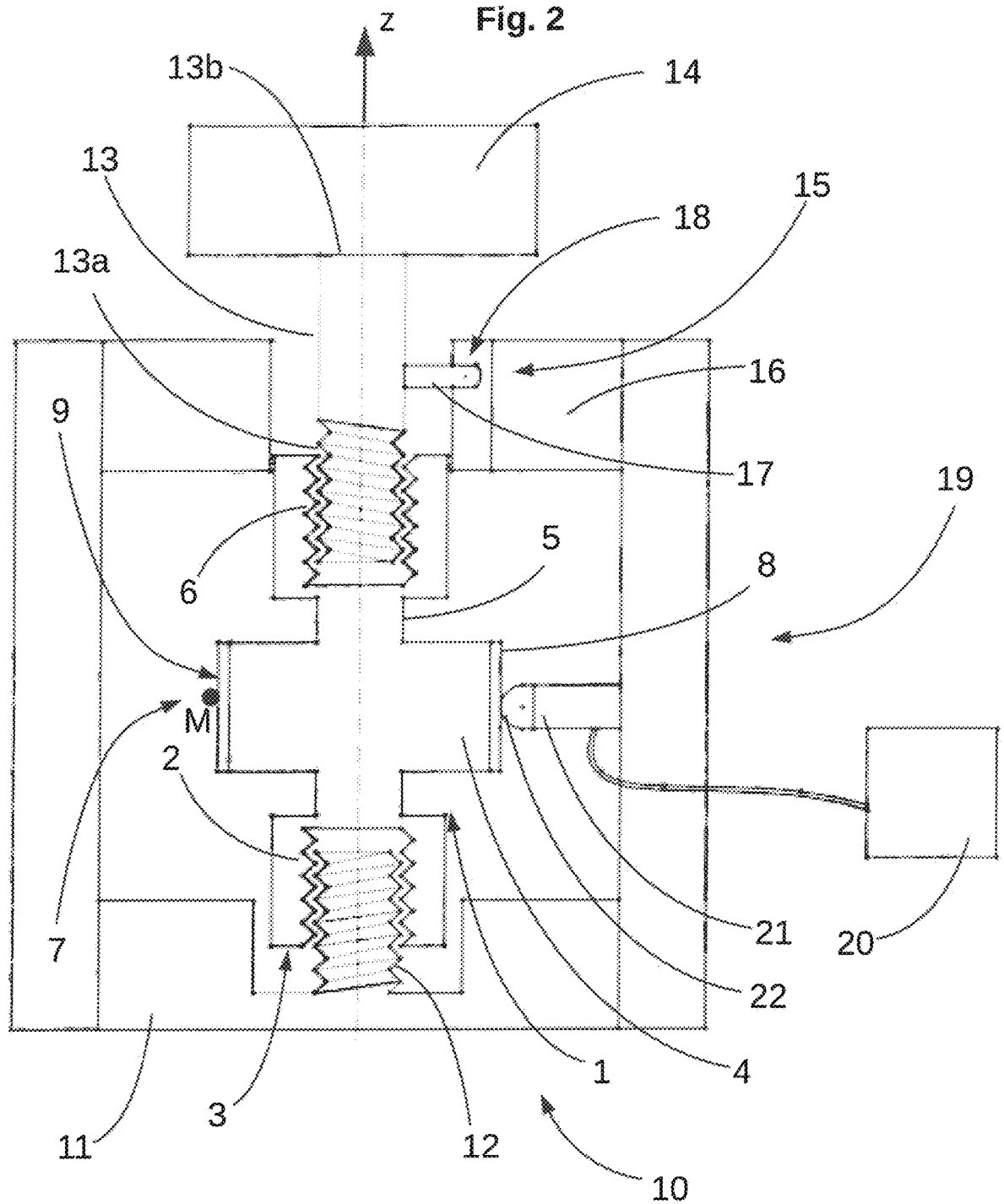
FIG. 2 illustrates a second embodiment of a screw-based translational motion control mechanism, in schematic manner, in cross-section.

With reference to FIGS. 1 and 2, the translational motion control mechanism comprises a rotor 1 also called rotor sub-assembly. Rotor 1 has a first end 3 presenting a first threaded part 2 comprising a first thread. The first thread has a first pitch. Rotor 1 has a second end 5 presenting a second threaded part 6 comprising a second thread that has a second pitch identical to or different from the first pitch. FIG. 1 illustrates a first threaded part 2 and a second threaded part 6 both of which are in the form of a rod provided with an external threading. FIG. 2 illustrates a first threaded part 2 and a second threaded part 6 both of which are in the form of a rod provided with an internal threading or tapping. It is naturally possible to have a rotor 1 with one end threaded and the other end tapped.

A central part 4 defining an active area 7 of rotor 1 is located between first and second threaded parts 2 and 6. Active area 7 has an advantageously circular drive area 9 of radius R the axis of rotational symmetry of which is an axis z which is also the rotational axis of first and second threaded parts 2, 6 and more generally of rotor 1. In advantageous manner, drive surface 9 has a square cross-section perpendicularly to axis z.

In advantageous manner, circular drive area 9 is covered by a friction layer 8. Friction layer 8 increases the friction coefficient between the active area and a stator which comes into contact with drive area 9 to make rotor 1 rotate. It is particularly advantageous to provide for friction layer 8 to have a good wear resistance. It is advantageous to choose a material having an adhesion coefficient of more than 0.1, preferably comprised between 0.2 and 0.5, to form the friction layer.

The motion control mechanism comprises a frame 10 also called fixed base sub-assembly. Frame 10 has a first surface with a first wall 11 that defines a first threaded part 12 having the first pitch and that collaborates with first threaded part 2 of rotor 1. Collaboration between first threaded part 12 of frame 10 and first threaded part 2 of rotor 1 enables rotation of rotor 1 with respect to frame 10 and translational movement of rotor 1 along axis z with respect to frame 10. In other words, first end 3 of rotor 1 and wall 11 of frame 10 are in the form of a screw operating in conjunction with a nut to form a screw-connection between first end 3 and wall 11. As illustrated in FIG. 1, first threaded part 12 of frame 10 can be a tapped hole. As illustrated in FIG. 2, first threaded part 12 of frame 10 can be a threaded salient area.

The motion control mechanism comprises an output shaft 13 having a first end 13a and a second end 13b. First end 13a of output shaft 13 is a threaded or tapped end with a thread having the second pitch to collaborate with second threaded part 6 of rotor 1. Collaboration between first end 13a and second threaded part 6 allows rotation of rotor 1 with respect to output shaft 13 as well as translational movement of output shaft 13 along axis z with respect to rotor 1. Depending on the embodiments, output shaft 13 can be a tube or a rod.

FIG. 1 schematically illustrates a first end 13a in the form of a tapped hole having a threaded part having the second pitch. Output shaft 13 collaborates with rotor 1 so that second end 5 of rotor 1 is inserted in the tapped hole of output shaft 13. FIG. 2 schematically illustrates a first end 13a in the form of a salient area having a threaded part having the second pitch. Output shaft 13 collaborates with rotor 1 so that the threaded salient part of output shaft 13 is inserted in tapped second end 5 of rotor 1.

Second end 13b of output shaft 13 has a fixing interface for fixing a load 14 designed to be moved and positioned in translation along axis z. Load 14 is advantageously a mirror that translates along axis z for performing refocusing of an optic system. It is also possible to move the mirror with another movement to perform aiming. Load 14 can also be a deformable area of an object such as a mirror for adaptive optics. It is also possible to provide for the load to form or to be part of a conformable telecommunications antenna. The load can also form the needle of a solenoid valve.

Frame 10 has a blocking device 15 configured to prevent rotation of output shaft 13 around axis z with respect to frame 10. In a particular embodiment, the frame has a second surface defined by a second wall 16 through which output shaft 13 passes. The second surface is located opposite the first surface. Second wall 16 advantageously defines a second hole for insertion of output shaft 13 and translation of output shaft 13 along axis z with respect to frame 10. Frame 10 and output shaft 13 can define blocking device 15.

In a particular configuration, blocking of rotation of output shaft 13 with respect to rotor 1 is obtained by a particular shape of the outer wall of output shaft 13 that collaborates with a particular shape of the hole arranged in wall 16. For example, the shape of the outer wall of output shaft 13 and the shape of the hole of wall 16 can be complementary and non-circular.

As an alternative or as a complement, output shaft 13 comprises a pin 17 collaborating with a groove 18 oriented along axis z in wall 16 to prevent rotation of output shaft 13 around axis z. It is possible for pin 17 and groove 18 to allow a slight rotational clearance.

As output shaft 13 is blocked in rotation, it is possible to fixedly install load 14 on output shaft 13 thereby remedying the drawbacks raised with regard to the documents JPH08251950 and US2012314269.

The motion control mechanism comprises a stator 19 having a contact area 22 configured to move with respect to a reference position, advantageously by deformation. Contact area 22 of the stator is in contact with drive area 9 of the rotor and moves from its reference position. When this movement takes place, it moves drive area 9 causing rotation of rotor 1. Stator 19 applies a force on rotor 1 by means of contact area 22. More particularly, stator 19 is deformed and the deformation applies a tangential force on drive area 9. Stator 19 is an electromechanical exciter or vibrator.

In other words, contact area 22 of stator 19 is in contact with drive surface 9 so that the movements applied by contact area 22 on drive surface 9 make rotor 1 rotate.

Stator 19 comprises a control circuit 20 that excites a mechanical oscillator 21. Oscillator 21 is fixed to frame 10 and deforms around a rest position or around a reference position. The rest position of oscillator 21 is obtained in the absence of power supply. The reference position can be representative of a reference power supply or the rest position. Oscillator 21 animates contact area 22 which is in contact with drive area 9 to drive rotor 1 in rotation.

Control circuit 20 generates signals sent to oscillator 21 so that oscillator 21 produces micro-movements designed to make rotor 1 rotate around axis z. Control circuit 20 can be connected to oscillator 21 by any suitable means, for example by a cable. The micro-movements are linear micro-translations that are transmitted tangentially to the rotor to make the latter rotate. Oscillator 21 has a contact area 22 that comes into contact with cylindrical drive area 9 of rotor 1. In a particular embodiment, control circuit 20 is configured to apply oscillating signals which make oscillator 21 oscillate around its reference position.

In advantageous manner, a micro-translation movement of contact area 22 of oscillator 21 performs driving of drive surface 9 by friction, resulting in micro-rotation of rotor 1. This micro-rotation of rotor 1 produces a micro-movement in translation along axis z of output shaft 13. When these micro-movements are repeated, a long translation of output shaft 13 is obtained performing positioning of load 14 in translation along axis z.

In a particular embodiment, oscillator 21 applies a permanent contact on drive area 9. The micro-movements produced by the stator result in rotor 1 being moved in a manner that is called movement by sliding-adhesion. In the adhesion phase obtained by a slow movement of the stator, oscillator 21 is in contact with the rotor so that movement of oscillator 21 makes rotor 1 rotate, the adhesion being maintained between the stator and rotor. In the sliding phase obtained by high-speed movement of the stator, oscillator 21 remains in contact with rotor 1 but slides on drive area 9. Advantageously, control circuit 20 applies a transient excitation on rotor 1 by means of oscillator 21 so as to successively generate electric signals causing the sliding phases with respect to rotor 1. Deformation of stator is performed with a first deformation rate that maintains the adhesion with the rotor. After rotation of the rotor in a first direction, a sliding step of the stator with respect to the rotor is performed by deformation of the stator in is the second direction with a higher deformation rate. The slow deformation of the stator can be performed so as to generate or not generate movement of the rotor by inertia once the deformation of the stator has been stopped.

In another particular embodiment, to achieve movement by sliding-adhesion, control circuit 20 excites oscillator 21 by means of at least one sinusoidal signal with a frequency of more than 1 kHz and less than 100 kHz, preferentially more than 20 kHz to be ultrasonic. Control circuit 20 applies at least one harmonic excitation on rotor 1 by means of oscillator 21 so as to generate a substantially elliptical vibration at the resonance of oscillator 21. The two embodiments can be applied successively by the same control circuit.

In another particular embodiment, the micro-movements enable rotor 1 to be moved in a manner called by detachment-adhesion. During the micro-movements, oscillator 21 loses contact with rotor 1 in the detachment phases and then comes back into contact with rotor 1 in the adhesion phases. The adhesion phases can play a role in maintaining the position of rotor 1.

According to this particular embodiment, to perform movement by detachment-adhesion, control circuit 20 and oscillator 21 form a stator of a quasi-static stepper motor. Control circuit 20 applies a quasi-static excitation on rotor 1 by means of oscillator 21 so as to generate quasi-static movements on rotor 1. When contact is made between oscillator 21 and rotor 1, adhesion takes place to make the rotor rotate.

Rotation of rotor 1 fixed to frame 10 by the spiral-wound threaded connection formed by first threaded part 2 of rotor 1 and first threaded part 12 of frame 10 results in translational movement of the rotor along axis z. The direction of rotation of rotor 1 defines the direction of movement of rotor 1 along axis z to move central part 4 of rotor towards or away from wall 11. A full turn of rotor 1 produces a translation along axis z by a value equal to the first pitch of rotor 1. When rotation of rotor 1 takes place, blocking system 16 prevents rotation of output shaft 13 around axis z. Output shaft 13 moves in translation and not in rotation.

Second threaded part 6 of rotor 1 performs guiding of output shaft 13 via ah helical connection having the second pitch relatively to rotor 1. When rotor 1 performs a full turn, output shaft 13 moves in translation with respect to rotor 1 by a distance equal to the second pitch.

Movement of output shaft 13 with respect to frame 10 when rotation of rotor 1 takes place consequently corresponds to the sum of the translation of rotor 1 with respect to frame 10 and of the translation of output shaft 13 with respect to rotor 1.

In a particular embodiment illustrated in FIG. 1, the threads of threaded parts 2 and 6 are oriented so as to form a differential assembly. A full turn of rotor 1 results in translation of output shaft 13 by a value equal to the difference of the screw pitches of first and second threaded parts 2 and 6 which have different pitches. Differential assembly enables a reduction of the travel of output shaft 13 with respect to the travel of rotor 1 by a predetermined factor to be obtained. Rotor 1 translates in one direction with respect to frame 10 and output shaft 13 translates in the other direction with respect to rotor 1.

In another particular embodiment illustrated in FIG. 2, the threads of threaded parts 2 and 6 are in the form of an additive construction. A full turn of rotor 1 results in translation of output shaft 13 by a value equal to the sum of the screw pitches of first and second threaded parts 2 and 6. Rotor 1 translates in one direction with respect to frame 10 and output shaft 13 translates in the same direction with respect to rotor 1.

In both these cases, the force chain between load 14 (or output shaft 13) and frame 10 only passes via rotor 1 and the screw-connections of the two threads without passing via excitation device 19 or additional bearings. This configuration forms a motion control mechanism providing an enhanced resistance to external stresses, vibrations and shocks. On account of the frictions existing in the screw-connections of threads 2 and 6, rotor 1, output shaft 13 and load 14 are naturally blocked in position when powered-off, whatever their intermediate position.

On account of the kinematics of the motion control system combining rotation and translation, a point M situated on drive surface 9 describes a spiral path of radius R around axis z. For this reason, contact area 22 comes into contact with different points of the generatrix of drive surface 9. The wear of the outer layer of drive surface 9 is therefore uniformly distributed, thereby giving the motion control mechanism an enhanced lifespan.

Depending on the design of stator 19, the amplitude of the linear micro-movements of contact area 22 of the stator can be situated between 1 µm and 100 µm, typically 10 µm. Thus, for a radius R of drive surface 9 equal to 16 mm and micro-movement amplitudes equal to 10 µm, a full rotation of rotor 1 is performed with about 10,000 oscillations. According to FIG. 1, with the differential configuration of rotor 1 having a first pitch P2=1 mm and a second pitch P6=1.1 mm, the translation per screw turn is T=P6−P2=0.1 mm. Taking the number of oscillations required per turn into account, the linear resolution of the mechanism is therefore 10 nm.

Control circuit 20 can operate either in open loop or in closed loop by means of at least one position sensor measuring the position of output shaft 13 or of load 14 with precision. Implementation of a closed loop control and a position sensor make it possible to take advantage of the nanometric resolution of the mechanism to achieve control with nanometric precision. This nanometric precision completes blocking in position of the mechanism when powered-off and the excellent resistance against external stresses, vibrations and shocks, thereby providing a suitable solution for achieving high-precision positioning for on-board systems. Control circuit 20 receives data from the position sensor, not illustrated. The data from the position sensor is representative of the position of output shaft 13 with respect to frame 10. Control circuit 20 transmits electric signals to oscillator 21 until the position sensor transmits a signal representative of the required position.

According to FIG. 2, with the additive configuration of rotor 1 having pitches P2=1 mm and P6=1 mm, the translation per screw turn is T=P6+P2=2 mm. Taking account of the number of oscillations required per turn, the linear resolution of the mechanism is therefore 200 nm. The resolution of this configuration is lower than the differential configuration, but it is suitable in certain on-board micro-positioning applications. This solution in return offers a much higher stroke speed and presents the advantage of keeping the mechanism in position when powered-off and an excellent resistance to external stresses, vibrations and shocks.

FIGS. 3, 5, 6 and 7 present a different, more detailed embodiment of the translational motion control mechanism presented in FIGS. 1 and 2. As for the previous embodiments, this again includes a rotor 1, a frame 10, an electromechanical excitation circuit 19 configured to excite and turn rotor 1, and the first and second threaded parts that collaborate to move output shaft 13 in translation.

Figure 3:
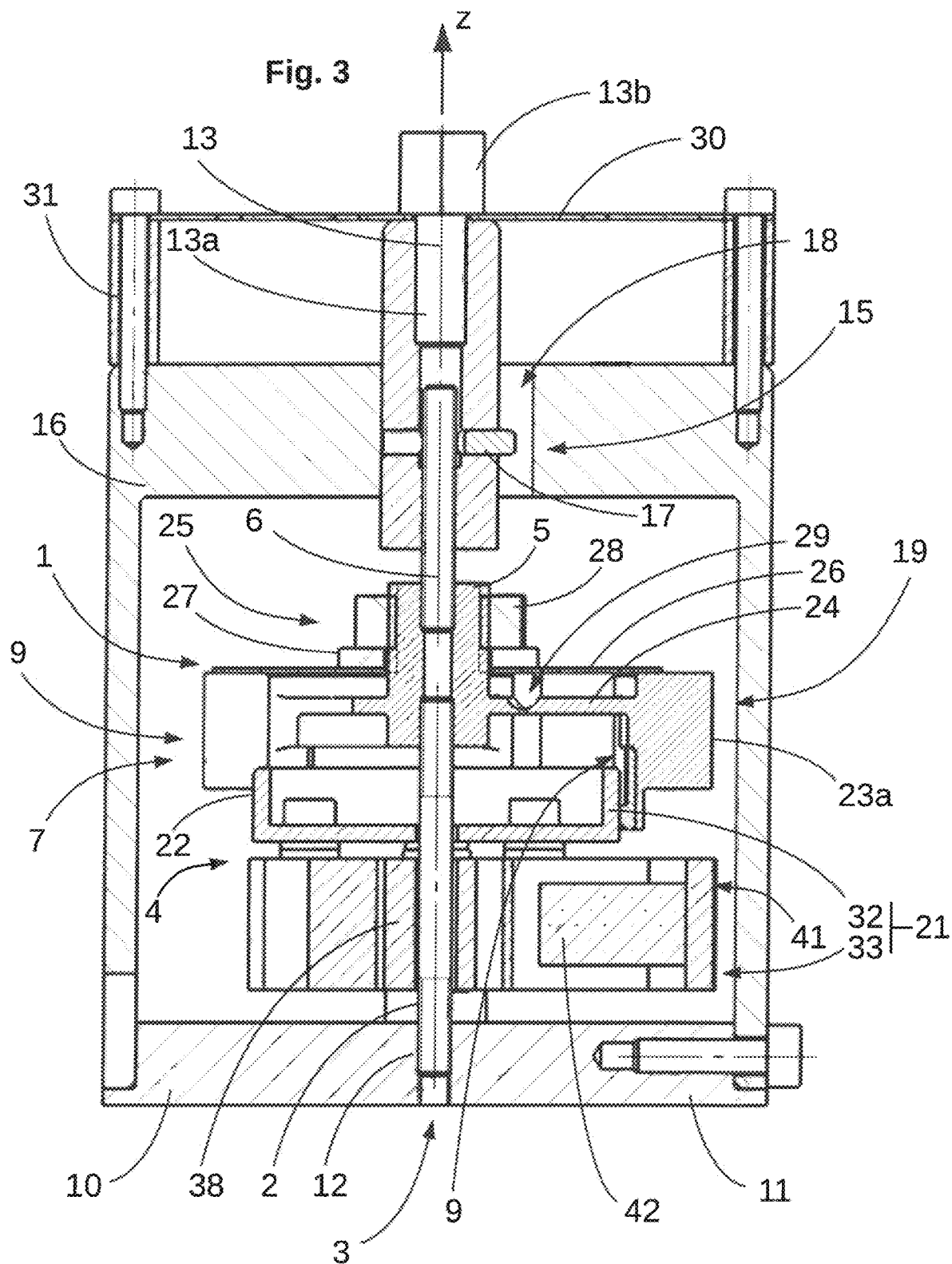
FIG. 3 illustrates a more detailed third embodiment of a screw-based translational motion control mechanism, in schematic manner, in cross-section.
Figure 5:
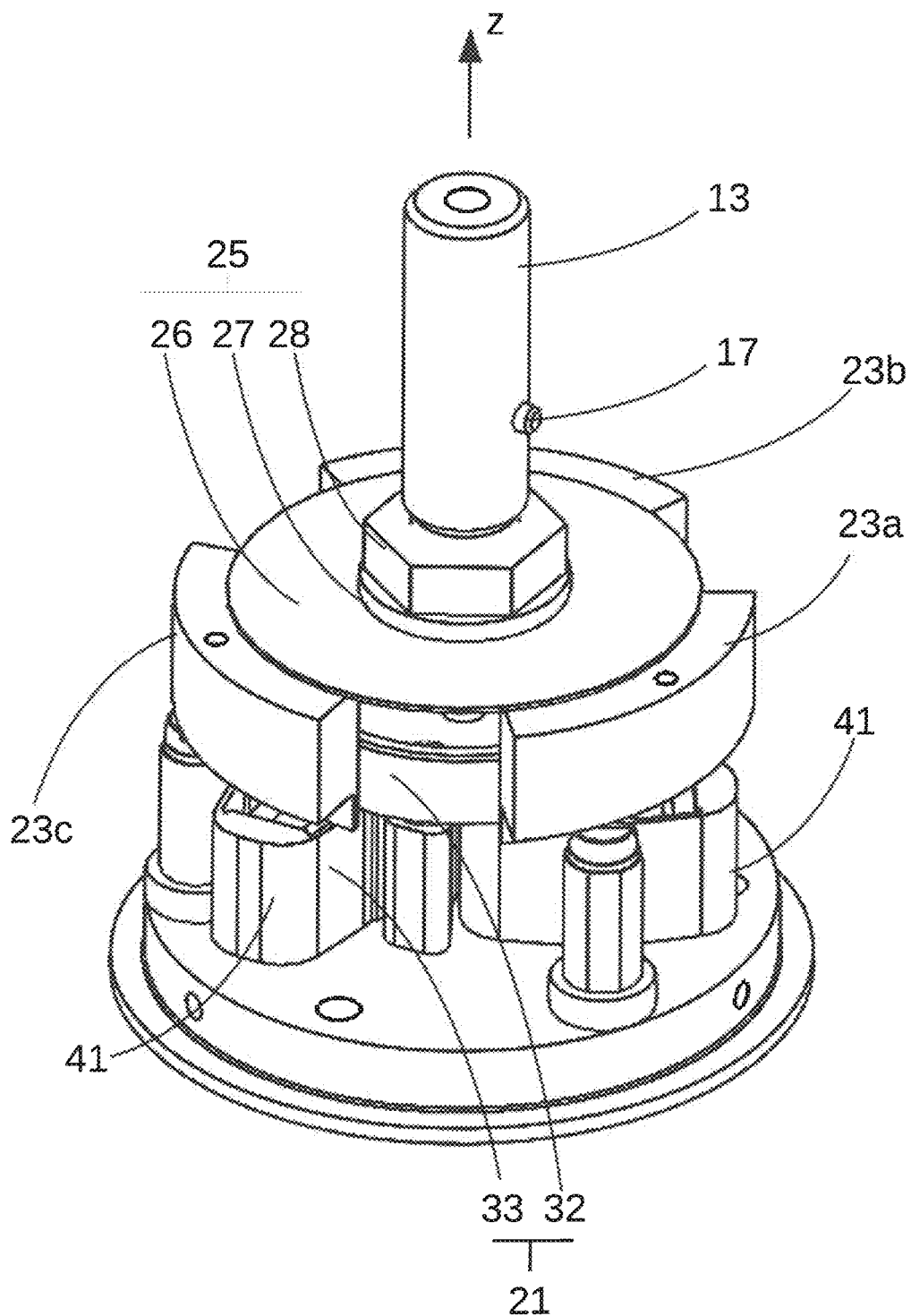
FIG. 5 illustrates the third embodiment of a screw-based translational motion control mechanism without a part of the frame, in schematic manner, in perspective view.

Whereas the embodiment illustrated in FIGS. 1 and 2 uses an active area 7 having a continuous second contact surface 9, the embodiment illustrated in FIGS. 3 and 5 represents a configuration having a partially open contact surface 9. Active area 7 of rotor 1 is formed by several sectors separated from one another. Oscillator 21 comes into contact with the different sectors to cause the micro-rotations.

In the embodiment illustrated in FIGS. 3 and 5, rotor 1 is provided with a hollow central area 4 so as to define for example a bell or a cup. It is then advantageous to use the inner surface of rotor 1 as drive surface 9. It is still preferable to have a circular or substantially circular drive surface to enhance control of rotation of rotor 1. In such a case, oscillator 21 is located inside the bell/cup so as to come into contact with the inner surface of drive surface 9.

As indicated in the foregoing, rotation of rotor 1 takes place when oscillator 21 is in contact with drive surface 9 and moves tangentially. It is therefore particularly advantageous to master the contact between oscillator 21 and the drive surface to ensure efficient transmission of forces.

In the embodiment illustrated in FIGS. 3 and 5, rotor 1 comprises a plurality of sectors 23, here three sectors 23a, 23b, 23c that are fixed to a central shaft of rotor 1. Drive surface 9 is segmented and defines a cylindrical surface of circular cross-section or assimilated to a circular cross-section. In rotation, drive surface 9 defines a circle having its centre located on axis z.

Sectors 23a, 23b, 23c are connected to the central shaft by arms 24a, 24b, 24c. It is advantageous to provide for rotor 1 to comprise a preloading system 25 designed to apply a stress on arms 24a, 24b, 24c to deform them. The sectors are spaced apart from one another.

Deformation of arms 24a, 24b, 24c moves sectors 23a, 23b, 23c in order to move drive area 9 towards oscillator 21 to achieve a quality contact. In the embodiment illustrated in FIGS. 3 and 5, preloading system 25 is configured to move inner drive surface 9 towards oscillator 21 thereby reducing radius R. In an alternative embodiment where the stator acts on the outer surface of a cylindrical rotor as in FIG. 1, preloading system 25 is configured to drive outer drive surface 9 towards oscillator 21 thereby increasing radius R.

The preloading system can be formed by a disc 26, washer 27 and nut 28 arranged to deform sectors 23a, 23b, 23c by deforming arms 24a, 24b, 24c and to create radial movements of sectors 23a, 23b, 23c. Preloading system 25 is designed to maintain the contact between the surface of segmented drive surface 9 of rotor 1 and oscillator 21. Preloading system 25 enables a flexible preloading force to be applied performing a function of taking up the clearance due to wear of drive surface 9 or of contact surface 22 with time.

It is advantageous to provide areas of reduced thickness 29a, 29b, 29c on arms 24a, 24b, 24c to make it easier to obtain radial movements with preloading system 25.

In the illustrated embodiment, frame 10 is formed by several parts including a first part forming first wall 11. The first part is fixed to a second part defining second wall 16. In the embodiment illustrated in FIGS. 3 and 4, output shaft 13 defines a fixing interface for securing the load designed to be driven and moved in translation along axis z.

Figure 4:
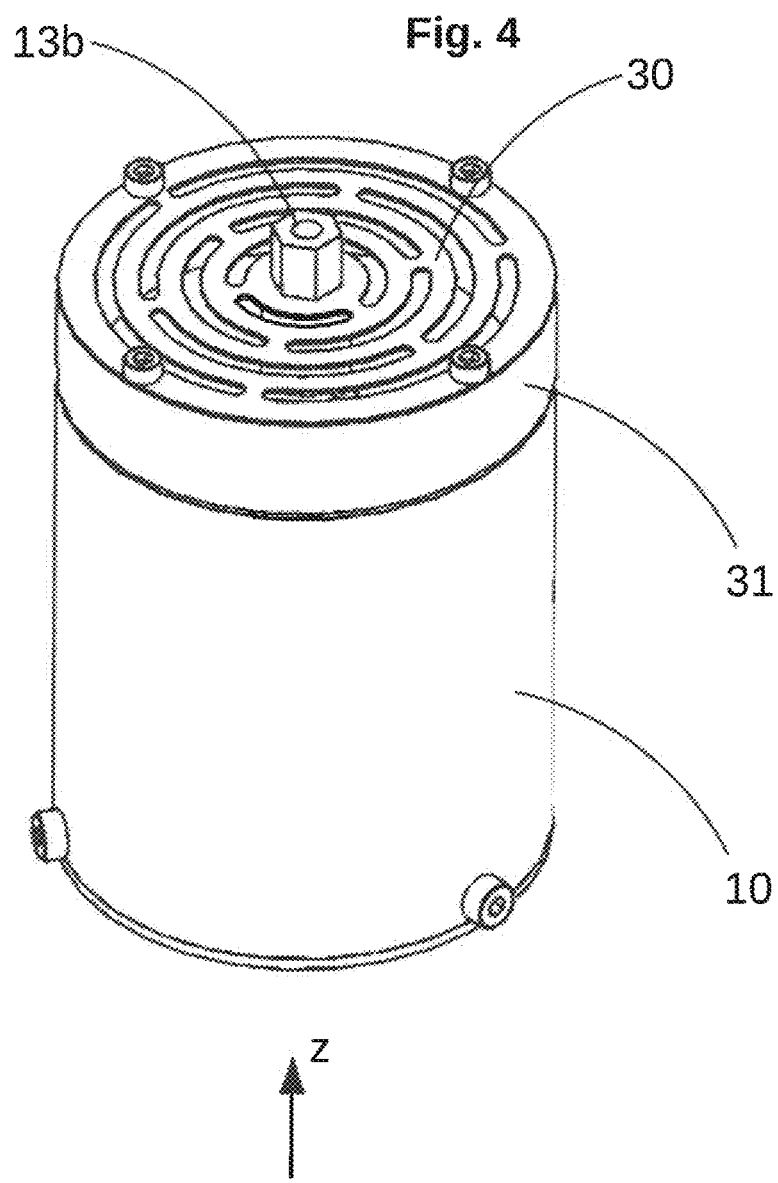
FIG. 4 illustrates a motion control mechanism provided with a flexible bearing, in schematic manner, in perspective view.

In a particular embodiment illustrated in FIGS. 3 and 4, blocking device 15 uses a flexible bearing 30 fixed both to output shaft 13 and to frame 10, preferably via one or more spacers 31. Flexible bearing 30 is designed so as to be flexible in translation direction z and stiff in the other directions. Its purpose is in particular to prevent rotation of output shaft 13 around axis z but also to eliminate the different parasitic rotations.

Flexible bearing 30 is advantageously in the form of at least one segmented membrane, for example a membrane formed by several thin blades arranged in the form of a honeycomb, spirals, a cross or concentric circles. Flexible bearing is formed by a plurality of blades presenting an axis perpendicular to the different surfaces that is parallel to axis z. Flexible bearing 30 blocks rotation around axis z while allowing translation along axis z of output shaft 13 with a resistive force that is lower than the translational force of rotor 1 along axis z. This resistive force can be adjusted for example by adjusting the length of spacers 31. This resistive force prevents internal clearance from occurring at the level of first and second threaded parts 2 and 6 when the direction of rotation of rotor 1 changes.

Flexible bearing 30 can be used as a complement or as an alternative to the blocking means illustrated in the foregoing, for example as a complement or as an alternative to pin 17 that runs in groove 18.

According to a particular embodiment, oscillator 21 has a circular contact section collaborating with drive surface 9. Oscillator 21 preferentially comes in the form of a monolithic bell or cup moving inside rotor 1 and presenting a contact area 22 of circular cross-section facing drive surface 9 of rotor 1. This embodiment of oscillator 21 facilitates an inertial operating mode resulting in driving of rotor 1 in sliding-adhesion manner. In the embodiment illustrated in FIG. 3, oscillator 21 is in the form of a cup housed inside the bell defined by active area 7 of rotor 1. As an alternative, active area 7 of rotor 1 is in the form of a cup housed inside the bell defined by oscillator 21. In both these cases, it is possible to provide for oscillator 21 or active area 7 (located inside the cup) to be in the form of a disc.

Oscillator 21 is advantageously kept in pressing contact against drive surface 9, via preloading system 25, to facilitate driving in sliding-adhesion of rotor 1 by oscillator 21.

Figure 6:
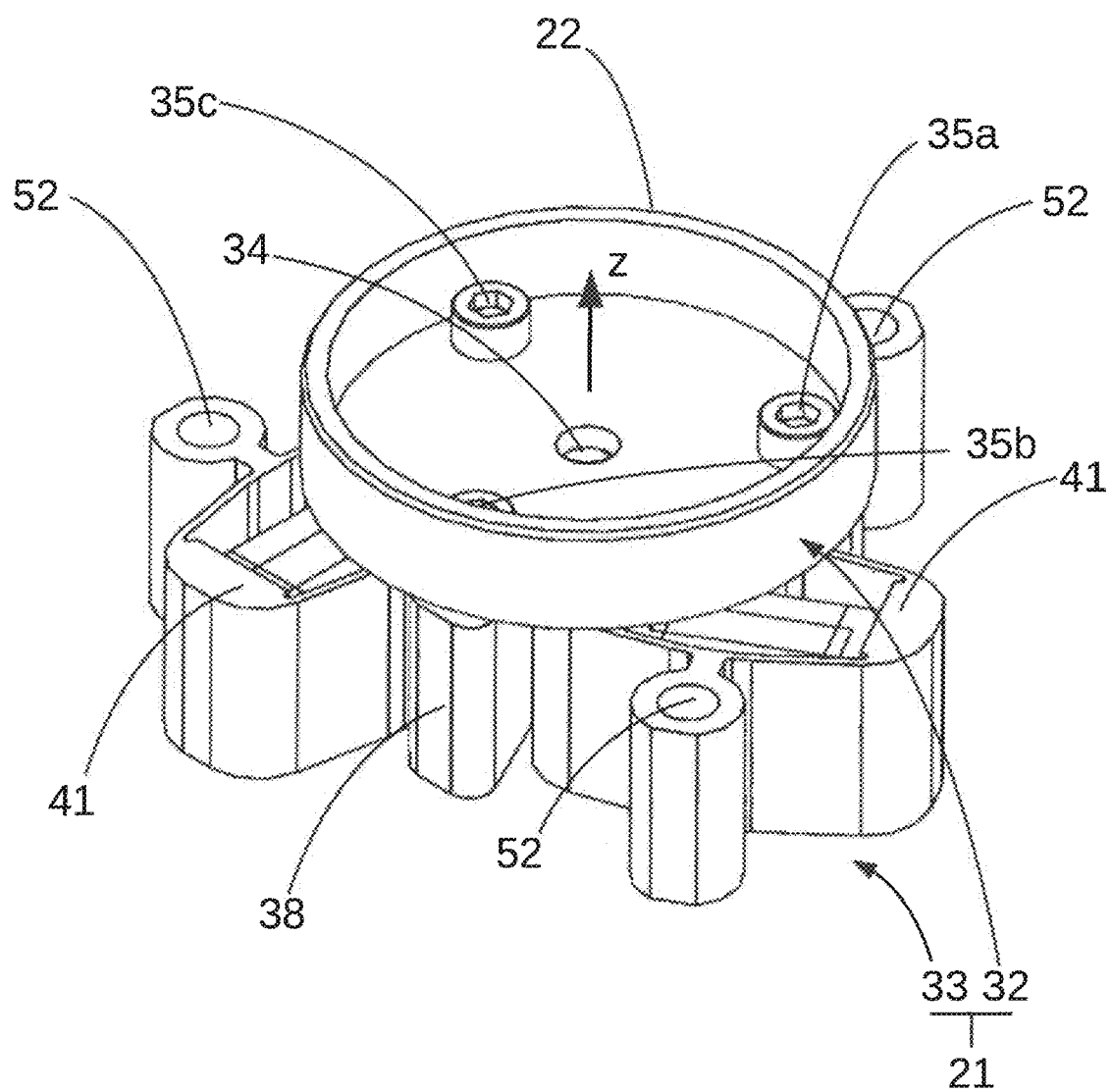
FIG. 6 illustrates a stator provided with an oscillating mass and with a rotatable exciter, in schematic manner, in perspective view.
Figure 7:
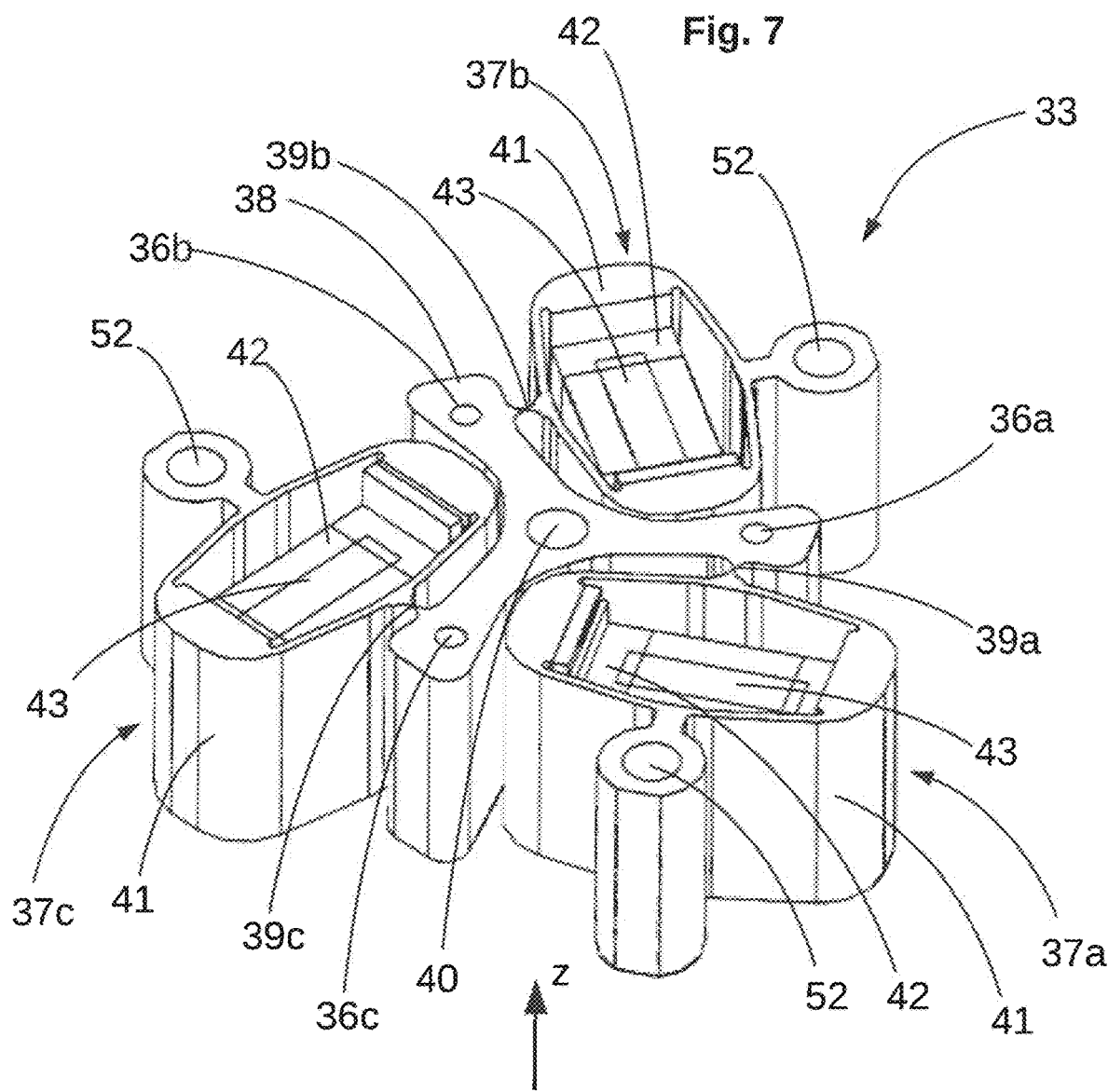
FIG. 7 illustrates the rotatable exciter in more detailed manner, in schematic manner, in perspective view.

In a particular embodiment illustrated in FIGS. 3, 5 and 6, oscillator 21 has an oscillating mass 32 associated with an exciter 33. Oscillating mass 32 is illustrated here in the form of a disc and advantageously in the form of a cup. Oscillating mass 32 defines a hole 34 for first end 3 of rotor 1 to pass through. Oscillating mass 32 can also be called stator ring. Exciter 33 is a device that deforms so as to move oscillating mass 32 with respect to a reference position. Exciter 33 is excited with deformation modes enabling forces tangential to the contact area to be created between oscillating mass 32 and drive surface 9. Exciter 33 is advantageously a piezoelectric exciter.

Exciter 33 is advantageously an angular actuator. Oscillating mass 32 is fixed to the exciter by three screws 35a, 35b, 35c that pass through oscillating mass 32 and are fixed to threaded interfaces 36a, 36b, 36c of exciter 33, for example to the three threaded interfaces 36a, 36b, 36c of the angular actuator illustrated in FIG. 7. What is meant by angular actuator 33 is an excitation device configured to generate movements of the actuator by rotation in angular displacements, in a the illustrated example by rotation around axis z. The displacements generated tangentially to contact area 22 are micrometric. Advantageously, the displacements are in the 1-1000 micron range.

In a particular embodiment, angular actuator 33 is composed of three piezoelectric actuators 37a, 37b, 37c, for example three amplified piezoelectric actuators. The three piezoelectric actuators 37a, 37b, 37c are connected to a support 38 comprising three branches. In advantageous manner, the three branches are uniformly spaced apart angularly in a plane perpendicular to axis z. Preferentially, angular actuator 33 presents a rotational symmetry around axis z, the angle of rotation being equal to 360°/n where n is the number of branches and/or of piezoelectric actuators. Deformation of the piezoelectric actuators makes support 38 rotate around axis z. In advantageous manner, the piezoelectric actuators have an end 52 designed to be fixed directly or indirectly to frame 10 and move support 38 according to their deformations.

Each piezoelectric actuator is connected to a branch of support 38 via one of flexible articulations 39a, 39b, 39c. Flexible articulations 39a, 39b, 39c connect a lateral surface of support 38 to a piezoelectric actuator 37a, 37b, 37c. Two adjacent piezoelectric actuators are separated by a branch and two adjacent branches are separated by a piezoelectric actuator.

Advantageously, piezoelectric actuators 37a, 37b, 37c, the branches and support 38 form a monolithic assembly made from one and the same material. Support 38 is star-shaped having a hole 44 for first end 3 of rotor 1 to pass through. Each piezoelectric actuator 37a, 37b, 37c comprises a shell 41 preferably made from metal which can have the shape of an ellipse or a rhombus. Each piezoelectric actuator 37a, 37b, 37c comprises a piezoelectric stack 42, for example a multi-layer piezoelectric ceramic. Shell 41 defines a housing for installing the piezoelectric stack. The dimensions are adjusted to the dimensions of the piezoelectric stack so that elongation of the piezoelectric stack results in contraction of shell 41. Advantageously, the piezoelectric actuators each have a shell defining a housing for a piezoelectric stack. The shell and piezoelectric stack are configured so that deformation of the piezoelectric stack by a first value in a first direction causes deformation by a second value higher than the first value in a second direction. The shell is connected to the support in the second direction. Support 38 moves in the second direction.

In advantageous manner, piezoelectric actuators 37a, 37b, 37c are arranged in the same plane perpendicular to axis z. The same is advantageously the case for piezoelectric stacks 42.

Each piezoelectric stack 42 has electrodes 43 electrically connected to control circuit 20 by a cable. When piezoelectric devices 42 are powered on, they is deform substantially proportionally to the applied control voltage and produce a micro-movement along their major axis. For example, a piezoelectric stack with a length of 10 mm produces a stroke ranging from 0 to 10 µm for a voltage ranging from 0 to 150V. The micro-deformation of piezoelectric stack 42 is amplified by shell 41 producing an amplified linear micro-movement directed along the minor axis of shell 41. With an amplification value that can be equal to 5, the amplitudes obtained thus range from 0 to 50 µm for a voltage ranging from 0 to 150V. Each of these amplified linear micro-movements is transmitted via flexible articulations 39 to star-shaped support 38. An amplified piezoelectric actuator is marketed by the applicant under the tradename APA®. An amplified piezoelectric actuator is described in the document FR2740276.

Piezoelectric actuators 37 of angular actuator 33 are arranged so that all their micro-movements together generate an angular micro-movement of support 38 and therefore of oscillator 21. The amplitude of these tangential micro-movements can vary between 0 and 50 µm depending on the value of the electric signal applied.

To achieve a movement of rotor 1 by sliding-adhesion, control circuit 20 applies a first signal that results in a slow deformation of oscillator 21. During this slow deformation, rotor 1 performs a micro-rotation. In an envisaged embodiment, oscillator 21 is in continuous contact with rotor 1. To prevent rotor 1 from returning to its initial position when oscillator 21 returns to its reference position. Oscillator 21 returns with a faster deformation rate so as to obtain sliding of rotor 1 with respect to oscillator 21, using the inertia of rotor 1. The latter is responsible for its sliding and prevents movement of the rotor in the opposite direction. Repetition of these movements makes it possible to achieve large strokes of rotor 1.

Figure 8:
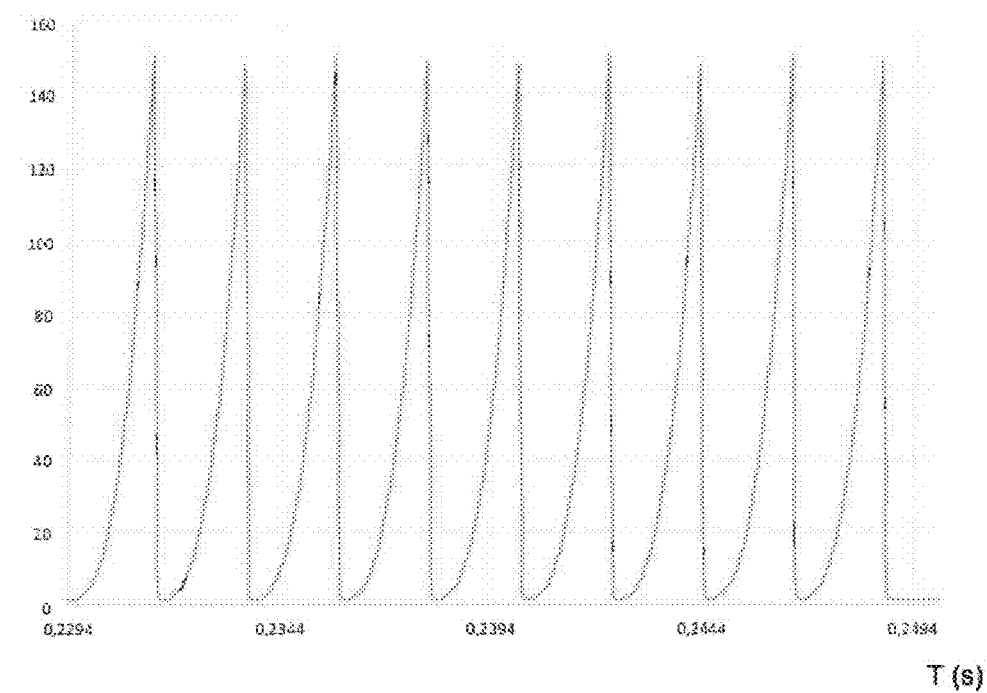
FIG. 8 presents a timing diagram of a control signal of the oscillator to perform a movement of the rotor of inertia stepper type.

Such a movement of rotor 1 can be obtained by applying electric excitation signals in the form of asymmetrical sawtooth signals, such as those presented for example in FIG. 8, by means of control circuit 20. Oscillator 21 produces oscillating angular micro-displacements in the direction tangential to the rotor appearing as a succession of slow deformations and high-speed returns to the reference position. The electric excitation signals are advantageously periodic. FIG. 8 illustrates a periodic signal V33 delivered by control circuit 20 to deform exciter 33.

For example purposes, the excitation signals are preferentially non-symmetrical signals with a rising edge shape different from the falling edge shape. What is meant by rising edge shape different from the falling edge shape is that the time required to reach the maximum value of the signal is different from the time required to reach the minimum value of the signal when a voltage peak occurs. As an alternative, the shape of the signal on the leading edge is different from the shape of the signal on the falling edge. Advantageously, the time difference ratio is greater than 5, preferably greater than 10. In the example of FIG. 8, the duration of the rising edge is substantially greater than the duration of the falling edge. The latter may also be the case. Numerous other signal shapes are possible with mixtures of sinusoidal signals with different frequencies.

An angular micro-movement of rotor 1 in the opposite direction can be obtained by inverting the control signals of FIG. 8, i.e. by having a high-speed deformation from the reference position followed by a slow return to the reference position.

On each oscillation of oscillator 21, oscillator 21 generates a micro-rotation of rotor 1. This micro-rotation of rotor 1 produces a micro-movement in translation along axis z of output shaft 13. When these micro-movements are repeated, a long translation of output shaft 13 is obtained enabling translation of load 14 along z.

It is possible to achieve a movement device in which the amplitude of the tangential micro-movements of rotor 1 can range between 0 and 50 μm depending on the maximum voltage applied by control circuit 20 for example on the piezoelectric devices. Therefore, for a drive surface 9 of radius R equal to 16 mm with amplitudes for example of 50 μm, full rotation of rotor 1 is performed with about 2,000 oscillations.

With a configuration of rotor 1 having first and second pitches equal to 1 mm and 1.1 mm, in differential configuration, the translation per turn of rotor 1 is T=0.1 mm. The differential configuration enables the travel of output shaft 13 to be reduced by a factor 10 with respect to the stroke of rotor 1. On account of the number of oscillations required per turn, the linear resolution of the mechanism at maximum voltage (for example 150V) is 50 nm. Applying the same principle, by reducing the control voltage for example from 150V to 15V, the linear resolution of the mechanism is 5 nm.

With lengths of first and second threaded parts of more than 20 mm for each of threaded parts, it is possible to obtain a stroke of rotor 1 of at least 20 mm. Taking account of the reduction by a factor 10 of the travel of output shaft 13 compared with the stroke of rotor 1, the travel of output shaft 13 can reach a value of 2 mm.

As a complement or an alternative to the embodiment described above, stator 19 is advantageously configured to define a fine positioning mode of the mechanism. To obtain a fine positioning mode, it is advantageous to apply electric signals in which the voltage applied on piezoelectric actuators 37 is made to vary slowly. In this manner it is possible to take advantage of the adhesion of rotor with oscillator 21. The micro-displacement of piezoelectric actuators 37 is transmitted continuously from oscillator 21 to rotor 1. Rotation of rotor 1 results in translation of rotor 1 and in translation of output shaft 13. In this embodiment, the translational travel of output shaft 13 is proportional to the control voltage of piezoelectric actuators 37. By making the voltage vary from 0 to 3V, the translational travel of output shaft 13 can be equal to 1 nm. The linear resolution of the motion control mechanism can be about 1 nm. Relatively to the large travel of 2 mm, the relative resolution is less than 1 for 1,000,000, i.e. 20 bits. Return to the reference position takes place by high-speed deformation of oscillator 21.

As previously, control circuit 20 can operate either in open loop or in closed loop by means of at least one position sensor measuring the position of output shaft 13. Implementation of a closed loop and a position sensor is advantageous to is take advantage of the nanometric resolution of the motion control mechanism in order to perform nano-positioning.

The motion control mechanism provides blocking in position when powered-off, a very good resistance to external stresses, vibrations and shocks, and a nanometric precision enabling a suitable high-precision positioning solution to be provided for on-board systems.

Figure 9:
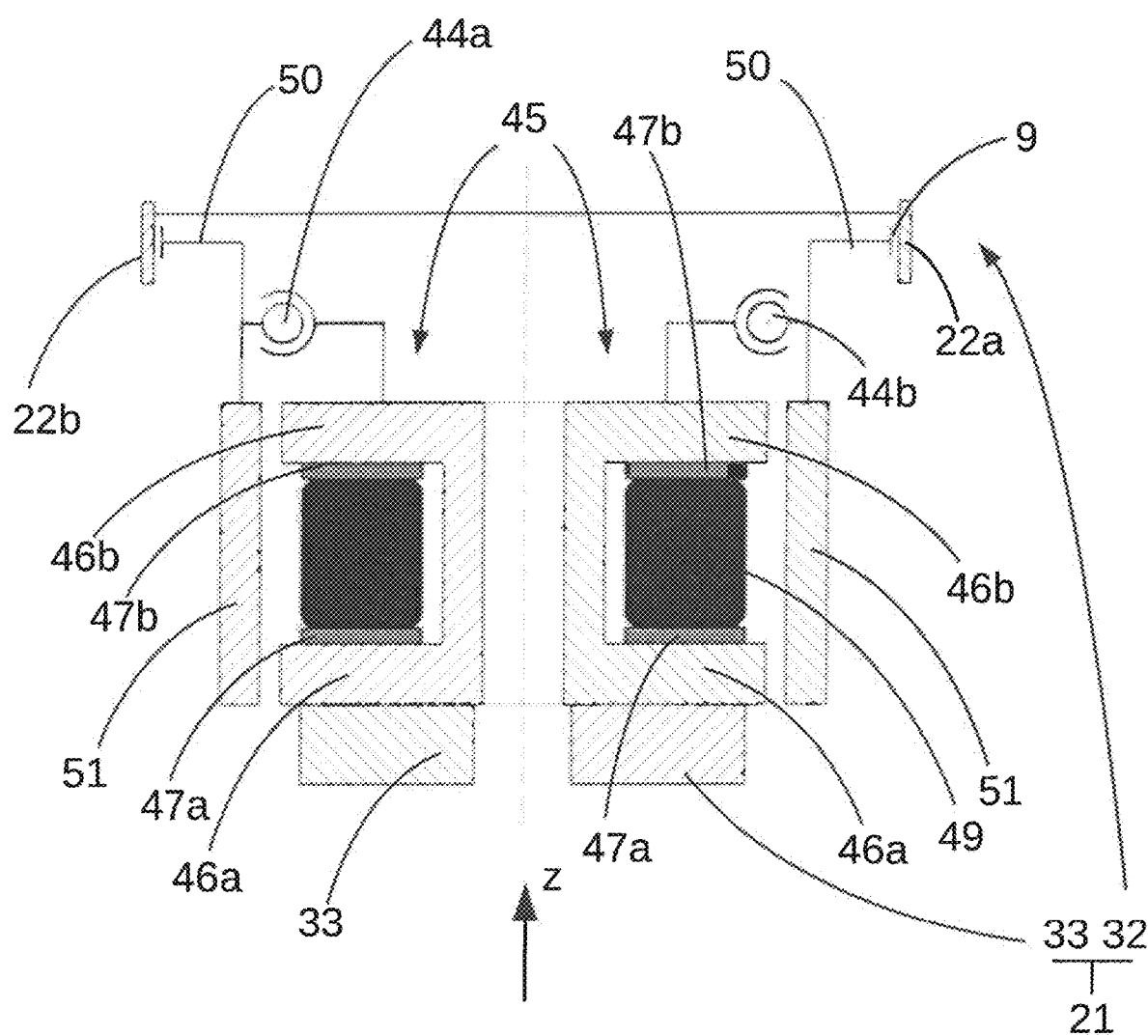
FIG. 9 illustrates a fourth embodiment of a radial contact actuator in schematic manner, in cross-section.

FIG. 9 illustrates another embodiment of a stator 19. Stator 19 comprises an oscillator 21 and a control circuit 20. Drive surface 9 is advantageously defined by the inner surface of a bell or a cup.

Control circuit 20 is configured to apply the electric signals performing quasi-static step-by-step driving, advantageously to achieve movement of the rotor of detachment-adhesion type.

Oscillator 21 is moved by means of an exciter 33, for example the angular actuator represented in FIG. 5.

Oscillator 21 is provided with several contact areas 22a, 22b that are arranged movable with respect to exciter 33 so that the contact areas can define an additional movement with respect to the deformations of exciter 33. For an oscillator 21 with a circular cross-section, contact areas 22a, 22b each move radially to make or prevent contact between oscillator 21 and drive area 9. In advantageous manner, at least two contact areas 22a, 22b are used. If two contact areas are used, they are placed along a diameter. The contact areas are spaced apart from one another and can be actuated simultaneously or independently.

Contact areas 22a and 22b are arranged to follow the deformations of exciter 33. Contact areas 22a and 22b are arranged on movable contact arms 50 so as to form movable contact areas.

Contact arms 50 have an active position and an inactive position. In the active position, a contact is made between contact area 22a/22b and drive surface 9. In the inactive position, no contact exists between contact area 22a/22b and drive surface 9. As an alternative, the contact pressure between contact area 22a/22b and drive surface 9 is lower than a threshold pressure ensuring adhesion when the contact area is in the inactive position. The pressure reduction enhances sliding of contact area 22a/22b with respect to drive surface 9.

In the active position of the arms, the movements of oscillator 21 are applied to rotor 1 as explained in the foregoing.

In an advantageous embodiment, contact areas 22a and 22b are arranged so as to be movable along a radius of circular drive area 9 to switch between the active and inactive positions. Preferentially, contact areas 22a and 22b are arranged movable pivoting around a pivot axis fitted on exciter 33, for example a swivel-pin 44a, 44b.

Oscillator 21 comprises a radial actuator 45 configured to switch the contact arms 50 between the active and inactive positions. In advantageous manner, radial actuator 45 is configured to move contact arms 50 radially by rotation to switch between the active and inactive positions. Radial actuator 45 causes movement of contact arm 50 so as to make or break the contact between contact area 22a, 22b and drive area 9.

In the illustrated embodiment, radial actuator 45 is mounted fixed on exciter 33 and the pivot axis or swivel-pin 44a, 44b of contact arm 50 is mounted fixed on radial exciter 45. In this manner, the movements of exciter 33 induce movements of contact arms 50. When at least one contact arm 50 is in the active position, the angular deformations of exciter 33 are applied to rotor 1 which moves in rotation.

By moving contact areas 22a, 22b between the active and inactive positions, the diameter of an oscillator 21 can be adjusted.

Arms 50 preferentially comprise magnetic armatures 51, preferentially made from ferromagnetic material. Actuation of magnetic armatures 51 causes rotation of contact arm 50 so as to make or break the contact between contact area 22 and drive area 9.

In a particular embodiment, radial actuator 45 is an electromagnetic actuator of electromagnet type that applies or does not apply a magnetisation on armatures 51 to move the arms in rotation. In a particular embodiment, radial actuator 45 has an electromagnet. In preferential manner, radial actuator 45 is formed by a magnetic circuit advantageously made from ferromagnetic material presenting poles 46a and 46b of permanent magnets 47a and 47b magnetised along axis z and a coil 49. The magnetic circuit can be formed by a part defining a housing for coil 49, the side walls of the housing directing the field lines towards armatures 51.

The rotation shaft or swivel-pin 44 is preferentially a flexible guide part providing a flexible biasing effect. Oscillator 21 defines a central hole along axis z for passage of rotor 1.

When coil 49 is powered-on, a magnetic field is created and the arms are attracted and stuck on poles 46a, 46b of radial actuator 45. Permanent magnets 47a and 47b are dimensioned so as to assist this attraction. Contact areas 22a, 22b press against drive surface 9 of rotor 1 by leverage effect around swivel-pin 44a, 44b.

In a particular embodiment, when coil 49 is powered-off, the arms are detached from poles 46a, 46b. By leverage effect around swivel-pin 44a, 44b, the contact pressure of contact areas 22a and 22b is reduced resulting in the friction between oscillator 21 and rotor 1 being minimised.

In a particular form of implementation, control by coil 49 by means of circuit 20 ensures a detachment condition of oscillator 21 with respect to rotor 1 or at least significantly reduces the contact pressure.

It is possible to use a segmented drive surface with gaps or a continuous drive surface. If the drive surface is segmented, it is preferable to have contact areas having a larger width than the separating distance between two consecutive areas of the drive surface or a larger number of contact areas than the number of segmented areas to ensure an efficient contact whatever the position of the oscillator with respect to the drive surface.

In advantageous manner, control circuit 20 supplies power to angular actuator 33 and radial actuator 45 in synchronised manner. For example, the timing diagram illustrated in FIG. 10 can be used to obtain operation of quasi-static step-by-step type.

At a time t0, radial actuator 45 is supplied by a voltage V45 and a current I45, and the contact arm moves to mechanically connect oscillator 21 with drive area 9. Oscillator 21 is not in movement and is in a reference position. Output shaft 13 is in a reference position.

Then, at a time t1, angular actuator 33 is progressively supplied by a voltage V33 generating a deformation of oscillator 21 representative of a rotational movement. As the contact arm performs the mechanical connection between oscillator 21 and rotor 1, angular actuation of oscillator 21 from the reference position is transmitted to rotor 1 which leads to output shaft 13 performing one step U13, i.e. a translation along axis z. Output shaft 13 has moved by a distance U13 from the reference position.

At time t2, the power supply of the radial actuator 45 is reduced and preferentially reversed so as to produce a radial contraction movement of contact arm 50 thereby mechanically disconnecting oscillator 21 from drive area 9 or at least significantly reducing the contact pressure so as to allow sliding of area 9 on surface 22. The same is the case for the current supplying actuator radial 45.

The oscillator is kept powered-on in order to maintain its deformation and prevent a return to the reference position from causing movement of rotor 1 to its initial position.

At time t3, voltage V33 of angular actuator 33 is progressively reduced until it reaches 0 to bring about a return movement of angular actuator 33. The angular actuator returns to its reference position.

At time t4, at the end of the cycle, when the power supplies of radial actuator 45 and angular actuator 33 are interrupted, output shaft 13 has performed a translation that represents an elementary step noted U13(1) in FIG. 10.

By repeating such a cycle several times, i.e. chaining steps t0 to t4 several times, output shaft 13 moves by a plurality of steps enabling large travels of output shaft 13 to be obtained. To reverse the direction of movement, the power supply timing diagram of angular actuator 33 simply has to be reversed, i.e. performing the sequence t1, t0, t3, t2, t4. It is possible to keep the initial sequence applying a voltage of opposite polarity to obtain movement of oscillator 21 in the other direction.

As for the previous embodiments, the travel of angular actuator 33 can be reduced by reducing the voltage applied to piezoelectric actuators 37. The angular displacements of oscillator 21 can thereby be reduced. Furthermore, by taking advantage of a differential arrangement of the pitches of rotor 1, it is possible to obtain nanometric translations of output shaft 13 and of load 14.

The use of radially movable arm 50 enables the contact pressure applied between oscillator 21 and drive area 9 to be actively controlled until oscillator 21 can be detached from the rotor and driving of rotor 1 can take place without any jerking whatsoever. The use of radially movable arm 50 means that generation of micro-vibrations in the mechanism is reduced, which is also desirable in certain nanometric position applications.

It is particularly advantageous to provide an optic system using the mechanism described in the foregoing, for example an interferometer, a telescope, a camera or a laser aiming system. It is also advantageous to provide an electromagnetic signal transmitter or receiver comprising at least one conformable tele-communications antenna, conformation of which is obtained by displacement of load 14. It is further possible to form an electro-fluidic system such as for example solenoid control valves where the load advantageously forms the needle of the solenoid valve.

These mechanisms are preferentially installed on-board in observation or communication satellites, aircraft, helicopters and space launchers as they can withstand high stresses caused by the load on acceleration. These mechanisms also present a certain interest in marine and terrestrial applications, for example in large telescopes or in photolithography equipment, to motorise heavy loads such as large mirrors or large lenses with precision without the risk of damage in case of ambient vibrations or earth tremors.

The invention claimed is:

1. Linear motion control mechanism of an output shaft comprising:

a rotor presenting a first threaded part, a circular drive surface rotatable around an axis and a second threaded part, the second threaded part being separated from the first threaded part, along the axis, by a central part comprising the circular drive surface;

a frame defining a first threaded part collaborating with the first threaded part of the rotor, the first threaded part of the rotor being fitted so as to form an helical connection with the first threaded part of the frame so that rotation of the rotor with respect to the frame causes translation of the rotor with respect to the frame along the axis;

an output shaft connected to the rotor, a stator configured to generate rotational micro-movements of the rotor, the stator having an oscillator with a contact area designed to be placed in contact with the circular drive surface to move the circular drive surface and rotor, a blocking device configured to prevent rotation of the output shaft around the axis with respect to the frame, wherein the output shaft has a second part designed to fix a load to be moved and a first threaded part collaborating with the second threaded part of the rotor, the first threaded part of the output shaft being fitted so as to form an helical connection with the second threaded part of the rotor so that rotation of the rotor with respect to the frame causes translation of the output shaft with respect to the rotor and frame along the axis.

2. Linear motion control mechanism according to claim 1, characterised in that the rotor defines a hollow area and the circular drive surface is an inner surface of the rotor.

3. Linear motion control mechanism according to claim 1, wherein the blocking device is flexible along the axis.

4. Linear motion control mechanism according to claim 3, wherein the blocking device comprises at least one partially open membrane formed by several thin blades arranged in the form of a honeycomb, spirals, a cross or concentric circles.

5. Linear motion control mechanism according to claim 1, wherein the oscillator has an exciter provided with at least one piezoelectric actuator arranged to deform the exciter, the oscillator being supplied by a control circuit actuating the exciter, the contact area being fixed to the exciter.

6. Linear motion control mechanism according to claim 5, characterised in that the exciter presents a rotational symmetry in a plane perpendicular to the axis and wherein the exciter comprises a support defining several arms and several piezoelectric actuators, each piezoelectric actuator being fixed to an arm of the support by a flexible articulation.

7. Linear motion control mechanism according to claim 6, wherein the piezoelectric actuators each have a shell defining a housing for a piezoelectric stack, the shell and piezoelectric stack being configured so that a deformation by a first value of the piezoelectric stack in a first direction causes a deformation of the shell by a second value higher than the first value in a second direction, the shell being connected to the support in the second direction.

8. Linear motion control mechanism according to claim 7, wherein the shells of the piezoelectric actuators and the support form a monolithic assembly.

9. Linear motion control mechanism according to claim 1, wherein the circular drive surface is segmented and wherein the stator has an oscillating mass of circular shape defining the contact area in contact with the circular drive surface.

10. Linear motion control mechanism according to claim 9, wherein the circular drive surface is defined by a plurality of sectors fixed to a shaft of the rotor by a plurality of arms, the linear motion control mechanism further comprising a preloading system configured to apply a stress on the plurality of arms and to modify a radius of the circular drive surface.

11. Linear motion control mechanism according to claim 5, wherein the oscillator is provided with at least one contact arm radially movable between an active position where the at least one contact arm applies a contact pressure with the circular drive surface higher than a threshold pressure designed to ensure the adhesion between the at least one contact arm and the circular drive surface and an inactive position in which the at least one contact arm does not have any contact with the circular drive surface or in which the at least one contact arm applies a contact pressure lower than said threshold pressure, and wherein the oscillator comprises a radial actuator supplied by the control circuit and configured to move the at least one contact arm between the active position and the inactive position.

12. Linear motion control mechanism according to claim 11 wherein the at least one contact arm comprises a magnetic armature and wherein the radial actuator is has a coil supplied by the control circuit and collaborating with a magnetic armature to move the magnetic armature and the at least one contact arm between the active position and the inactive position.

13. Linear motion control mechanism according to claim 12 wherein the at least one contact arm is mounted movable on a pivot link fitted in fixed manner on the exciter.

14. Method for using a linear motion control mechanism according to claim 1 successively comprising:
deforming the oscillator with a first deformation rate to cause a rotational movement of the rotor, the oscillator being deformed from a reference position and being in adherent mechanical contact with the circular drive surface,
deforming the oscillator with a second deformation rate higher than the first deformation rate to drive the oscillator towards the reference position, the second deformation rate causing sliding of the oscillator with respect to the circular drive surface.

15. Method for using a linear motion control mechanism according to claim 14 comprising applying non-symmetrical sawtooth AC electric signals to the piezoelectric actuators.

16. Method for using a linear motion control mechanism according to claim 1 comprising application of at least one sinusoidal signal to the oscillator, the sinusoidal signal having a frequency comprised between 1 kHz and 100 kHz so as to apply at least one harmonic excitation on the rotor by means of the oscillator to generate a substantially elliptical vibration at the resonance frequency of the oscillator.

17. Method for using a linear motion control mechanism according to claim 11 successively comprising:
placing the at least one contact arm in the active position to achieve contact of the at least one contact arm and adhesion with the circular drive surface,
deforming the oscillator from a reference position to obtain a component tangential to the cylindrical drive surface, deformation of the oscillator causing rotation of the rotor,
placing the at least one contact arm in the inactive position to eliminate the mechanical contact with the circular drive surface, or applying a contact pressure lower than an adhesion threshold pressure between the at least one contact arm and the circular drive surface,
moving the oscillator back to the reference position.

* * * * *